2,830,070

PREPARATION OF TRIMETHYL BORATE

George L. Cunningham, Cleveland, Ohio, assignor to Callery Chemical Company, Pittsburgh, Pa., a corporation of Pennsylvania No Drawing. Application December 1, 1954
Serial No. 472,532

5 Claims. (Cl. 260—462)

This invention relates to a new and useful cyclic process for the preparation of trimethylborate [B(OMe)$_3$] and more particularly to a process for the separation of trimethyl borate from the trimethyl borate-methyl alcohol azeotrope having the approximate composition

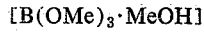

[B(OMe)$_3$·MeOH]

Trimethyl borate has been prepared in quantity by the reaction of boric acid with methyl alcohol followed by separation of the ester from the trimethyl borate-methyl alcohol azeotrope by washing the latter with concentrated sulfuric acid. This process of separation results in low yields of trimethyl borate. Various salts such as calcium nitrate, aluminum nitrate or the chlorides of zinc, calcium, sodium and lithium have been used by previous investigators to separate methyl alcohol from the trimethyl borate-methyl alcohol azeotrope. In such processes the methyl alcohol and trimethyl borate separate into two liquid layers and the methyl alcohol is recovered by distilling the lower layer until substantially all of the methyl alcohol is removed. The use of anhydrous salts for the separation of trimethyl borate from its methanol azeotrope is based on the fact that these salts are quite soluble in methanol and are relatively insoluble in trimethyl borate. In general, the best salt to use is one having the highest solubility in methanol. This salt is lithium chloride. However, when a solution of lithium chloride in methanol is evaporated the solution becomes extremely viscous and begins to bump and spatter. The anhydrous lithium chloride that comes out of the thick viscous solution adheres to the surfaces of the evaporating vessel. This hard cake of lithium chloride is a major problem in any commercial operation.

It is one object of this invention to provide a new and improved method for preparing trimethyl borate which circumvents the objections of known processes.

Another object is to provide a new and useful cyclic process for preparing trimethyl borate which uses various alcoholates for the separation of the trimethyl borate-methanol azeotrope.

A still further object is to provide a new and improved method for separating trimethyl borate from its methanol azeotrope by reacting the azeotrope with an alkali or alkaline earth metal alcoholate to form a metal tetraalkoxyborate which can be decomposed by heating to yield trimethyl borate and a metal alcoholate.

Other objects of this invention will become apparent throughout the specification and claims hereinafter related.

This new and improved method will be described more completely in the specification and the novelty thereof will be particularly pointed out and distinctly claimed.

This invention is based upon the discovery that trimethyl borate of high purity can be prepared in high yields by using a cyclic process in which the trimethyl borate-methanol azeotrope is reacted with a metal alcoholate to produce a tetraalkoxyborate [MB(OR)$_4$] and methanol. The methanol is distilled off and the tetraalkoxyborate recovered. The tetraalkoxyborate is then subjected to heat and vacuum to decompose it into trimethyl borate and the original metal alcoholate. The trimethyl borate is then recovered and the metal alcoholate is recycled for further reaction with more of the azeotrope.

In carrying out this process, the trimethyl borate-methanol azeotrope is prepared by any suitable process such as the reaction of boric acid or boric oxide with methanol. This azeotrope contains about 50 mol percent trimethyl borate and boils at 54.6° C. whereas methanol boils at 64° C. and pure trimethyl borate boils at 68° C. The azeotrope is added to an alkali or an alkaline earth metal methylate to form the metal tetramethoxyborate [MB(OCH$_3$)$_4$]. The methanol formed is then distilled off leaving the substantially pure tetramethoxyborate of the alkali metal or alkaline earth metal used. This metal tetramethoxyborate is finally decomposed by heating to an appropriate temperature to yield trimethyl borate and a metal alcoholate. The metal alcoholate is then reacted with more azeotrope and the cycle repeated.

I have also discovered that it is necessary to separate trimethyl borate from sodium tetramethoxyborate by distillation at reduced pressure because of the unfavorable vapor pressure relationship. I have experimentally determined the vapor pressure of trimethyl borate over sodium tetramethoxyborate to be as follows:

| Pressure (mm. Hg): | Temperature, ° C. |
|---|---|
| 3 | 250 |
| 13 | 280 |
| 19 | 290 |
| 27 | 300 |

From this data it can readily be seen that at 300° C. the sodium tetramethoxyborate has a vapor pressure of 27 mm. Thus, the trimethyl borate would have to be removed at pressures below 27 mm. since it is well known that one of the products of this decomposition, namely sodium methylate, begins to decompose at about 300° C. If the temperature of decomposition is lowered the vapor pressure is also decreased which requires the removal of the trimethyl borate at even lower pressures.

I have discovered that lithium tetramethoxyborate as well as some of the alkaline earth metal tetramethoxyborates have vapor pressures considerably higher at a given temperature than sodium tetramethoxyborate. The following table shows the vapor pressure of trimethyl borate over lithium tetramethoxyborate at various temperatures.

| Pressure (mm. Hg): | Temperature, ° C. |
|---|---|
| 25.5 | 230 |
| 63.5 | 250 |
| 96.5 | 260 |

It is obvious from this data that the vapor pressure of lithium tetramethoxyborate is considerably higher than the vapor pressure of sodium tetramethoxyborate. Thus, at 250° C. the vapor pressure of lithium tetramethoxyborate is 63.5 mm. This temperature is much lower than the decomposition temperature of lithium methylate and consequently there is no danger that the product will decompose. For this reason it is a distinct advantage to use lithium tetramethoxyborate in the overall cycle.

Although it is important to use a tetramethoxyborate compound with a relatively high vapor pressure in order to prevent decomposition of the resulting alcoholate and to minimize the difficulty of recovering the trimethyl borate, the tetramethoxyborate selected should not have too high a vapor pressure at low temperatures. In the first step of the overall cycle, the tetramethoxyborate is formed in a methanol solution and the methanol is removed by distillation. Thus, the tetramethoxyborate selected must have a vapor pressure low enough to assure that a minimum amount of trimethyl borate will be distilled with the methanol. This difficulty can be avoided by distilling off the methanol under reduced pressure and hence at lower temperatures. Since the methanol recovered from the azeotrope can be used to react with more boric acid or its derivatives to form more azeotrope, it is obvious that the loss of a small amount of trimethyl borate in the methanol is not a serious matter.

The reaction of trimethyl borate with alcoholates to form the tetramethoxyborate is quite rapid as is also the decomposition of the tetramethoxyborate to alcoholate and trimethyl borate and therefore the overall cycle can be carried out in an efficient and economical manner.

In one experiment, 54 g. of solid sodium methylate were added to 137.5 g. of trimethyl borate-methanol azeotrope containing about 50 mol percent of trimethyl borate. A reaction took place as evidenced by the evolution of heat. The methanol was distilled off at atmospheric pressure and the solid crystals of sodium tetramethoxyborate remaining were freed from the last traces of methanol by heating at 120° C. under reduced pressure. A total of 33.6 g. of methanol was recovered. The sodium tetramethoxyborate was heated to 280° C. and the trimethyl borate was removed at pressures below 13 mm. A total of 103.8 g. of substantially pure trimethyl borate was obtained. The sodium methylate remaining was used in another cycle.

In another experiment, 18.9 g. of solid lithium methylate were added to 68.7 parts of trimethyl borate-methanol azeotrope containing about 50 mol percent trimethyl borate. Considerable heat was evolved and the methanol was removed by distillation at atmospheric pressure leaving crystals of lithium tetramethoxyborate. The final traces of methanol were removed by heating at 120° C. under reduced pressure. A total of 16.8 g. of methanol was recovered. The lithium tetramethoxyborate was heated to 250° C. and the trimethyl borate was removed at pressures below 63.5 mm. A total of 51.9 g. of substantially pure trimethyl borate was obtained. The solid lithium methylate remaining was used in another cycle.

Other experimental data show that alkaline earth methylates react in a similar manner to produce tetramethoxyborates which may be decomposed to recover trimethyl borate. Similarly other lower alkyl alcoholates such as ethylates or propylates may be used. When a different alcoholate is used the tetraalkoxyborate which is formed is of a mixed composition, e. g. $NaB(OEt)(OMe)_3$, but which can be decomposed upon heating to produce trimethyl borate and the metal alcoholate.

Although several embodiments of this invention have been described it should be understood that within the scope of the claims appended hereto this invention may be practiced otherwise than as specifically described.

What I desire to claim and secure by Letters Patent of the United States is:

1. A method of preparing trimethyl borate which comprises reacting trimethyl borate-methanol azeotrope with a metal alcoholate to form a metal tetraalkoxyborate, distilling off the methanol formed, decomposing the said tetraalkoxyborate by heat and condensing and recovering the trimethyl borate thus formed.

2. A method according to claim 1 in which the metal alcoholate is selected from the class consisting of the alkali and alkaline earth metal methylates.

3. A method according to claim 1 in which the tetraalkoxyborate is decomposed and the trimethyl borate is removed therefrom at a temperature below which there is any substantial decomposition of the by-product metal alcoholate.

4. A cyclic method of preparing trimethyl borate which comprises adding trimethyl borate-methanol azeotrope to sodium methylate to form sodium tetramethoxyborate, removing the methanol by distillation at reduced pressure, heating the sodium tetramethoxyborate remaining and recovering the trimethyl borate formed by distillation at reduced pressure at a temperature below 300° C. and returning the solid sodium methylate for reaction with more azeotrope.

5. A cyclic method of preparing trimethyl borate which comprises adding trimethyl borate-methanol azeotrope to lithium methylate to form lithium tetramethoxyborate, removing the methanol by distillation at reduced pressure, heating the lithium tetramethoxyborate remaining to form trimethyl borate and lithium methylate, then recovering the trimethyl borate by distillation at reduced pressure at a temperature below 260° C. and returning the solid lithium methylate for reaction with more azeotrope.

No references cited.